March 10, 1964
M. L. PITTMAN
3,124,024
TOOL JOINT SHOULDER FACING MACHINE
Filed March 16, 1962
2 Sheets-Sheet 1
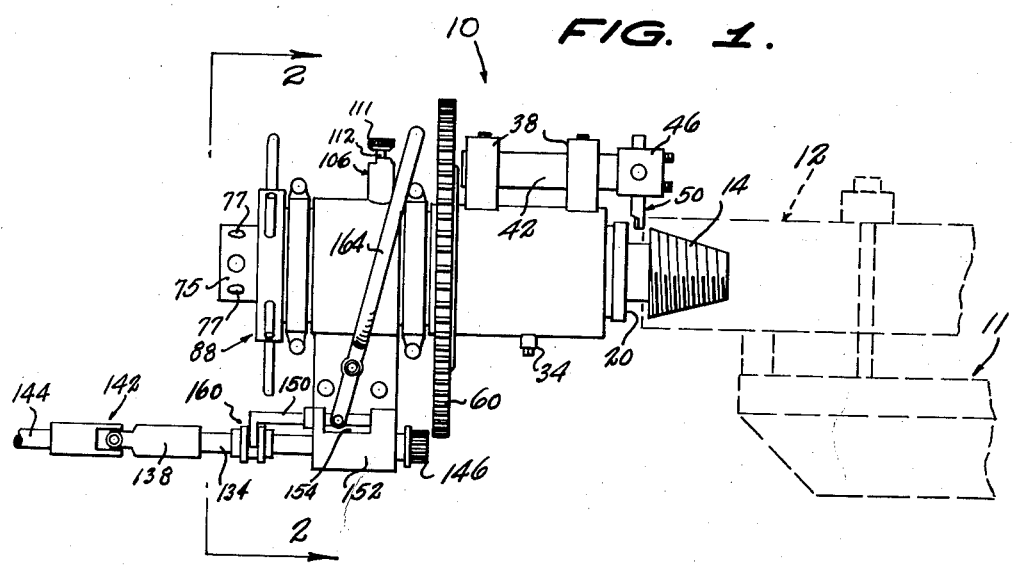
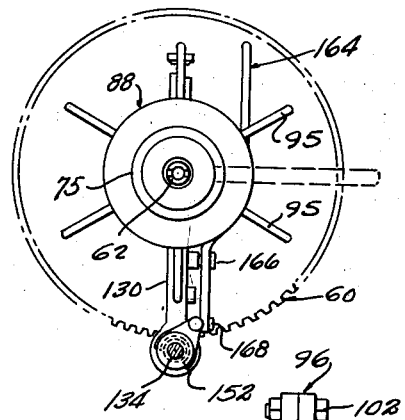
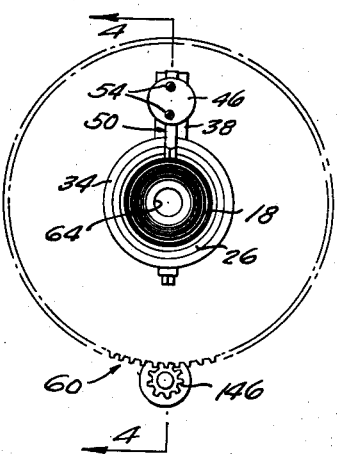
INVENTOR.
MARCUS L. PITTMAN,
BY
McMorrow, Berman + Davidson
ATTORNEYS.

March 10, 1964

M. L. PITTMAN 3,124,024

TOOL JOINT SHOULDER FACING MACHINE

Filed March 16, 1962

INVENTOR.
MARCUS L. PITTMAN,
BY
McMorrow, Berman & Davidson
ATTORNEYS.

United States Patent Office 3,124,024
Patented Mar. 10, 1964

3,124,024
TOOL JOINT SHOULDER FACING MACHINE
Marcus L. Pittman, 4003 Greenwood Road,
Shreveport, La.
Filed Mar. 16, 1962, Ser. No. 180,105
3 Claims. (Cl. 82—4)

This invention relates to a novel machine for facing or refacing the sealing shoulders on pipe joints and tool joints, especially but not exclusively, those used in drilling oil, gas, and water wells.

The primary object of the invention is the provision of an efficient, more practical, and easily used machine of the kind indicated, adapted to be mounted on a pipe or tool joint to be faced, clamped to a support, such as a work bench, and which has flexible shaft driven drive means, from motor means separate from the machine, whereby the weight of and stresses of operation of motor means are not imposed either on the machine or upon the pipe or joint to be faced.

Another object of the invention is the provision of a machine of the character indicated above, which embodies a relatively stationary mandrel, adapted to be threadably supported on the pipe or tool joint to be faced, a rotary cutter assembly which is journaled on the mandrel, and is operatively connected to the drive means by manual clutch-operated gear means, and vernier means for feeding the cutter assembly toward the pipe or tool shoulder to be faced.

Other important objects and advantageous features of the invention will be apparent from the following description and the accompanying drawings, wherein, for purposes of illustration only, a specific form of the invention is set forth in detail.

In the drawings:

FIGURE 1 is a schematic and fragmentary side elevation showing a machine of the present invention installed on a female tool joint, clamped on a support, and a flexible shaft connected to the drive means of the machine, the clutch being in disconnect position;

FIGURE 2 is a vertical transverse section taken on the line 2—2 of FIGURE 1;

FIGURE 3 is an elevation of the inner end of the machine;

FIGURE 5 is a fragmentary vertical transverse section taken on the line 5—5 of FIGURE 4.

Figure 4:
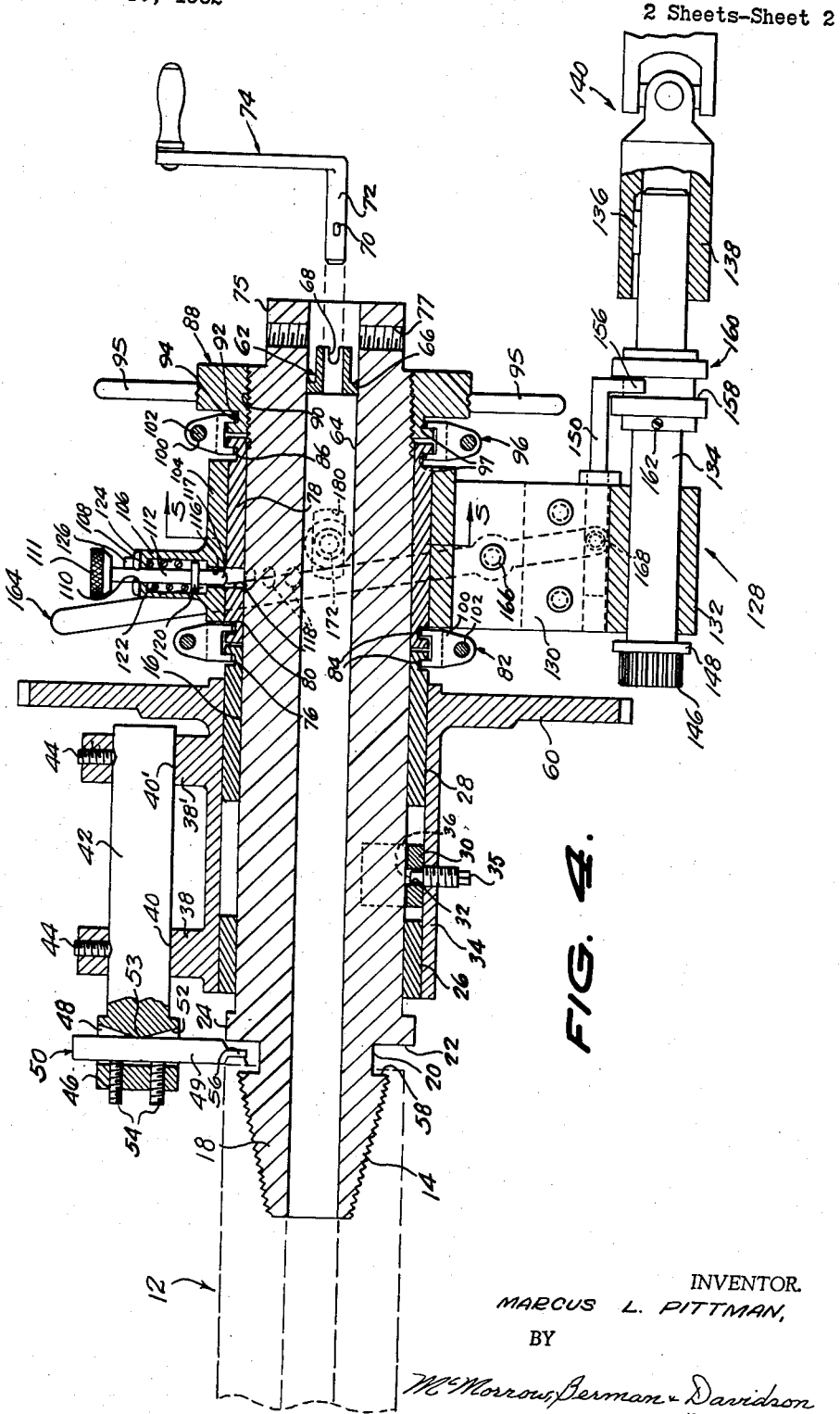
FIGURE 4 is an enlarged vertical longitudinal section taken on the line 4—4 of FIGURE 3, showing a mandrel rotating handle before application to the mandrel.

Referring in detail to the drawings, wherein like numerals designate like parts throughout the several views, the illustrated machine, generally designated 10, is shown in association with a well-drilling tool 12 having a threaded conical female joint 14. However, it will be understood that the machine 10 is readily adaptable to facing pipes or tools having threaded male joints. The tool 12 is shown clamped upon a suitable support 11.

The machine 10 comprises an elongated tubular cylindrical mandrel 16 having a threaded conical tip 18, on its inner or forward end, at the outer or rear end of which the mandrel is formed with an annular groove 20, in which the cutter, hereinafter described, works, and whose outer or forward face 22 is adapted to be used, with a gauge (not shown) for gauging the depth of cut of the cutter. An enlarged diameter lateral annular stop shoulder 24 is on the mandrel 16 immediately behind the groove 20.

Slidably circumposed on the mandrel 16, behind and usually spaced from the shoulder 24, are spaced forward, relatively stationary sleeve bearings 26 and 28, respectively. An arcuate intermediate shoe 30 is spaced between the bearings 26 and 28 and is formed with a hole 32. An elongated rotary sleeve 34 is circumposed on the bearings 26, 28 and the shoe 30, and has threaded therethrough a screw 35 having a reduced unthreaded terminal 36 which is engageable in the hole 32, for holding the sleeve stationary relative to the mandrel 16, as when installing or removing a cutter assembly, hereinafter described.

The sleeve 34 carries a pair of longitudinally spaced and aligned radial forward and rear posts 38 and 38', having longitudinally aligned bores 40 and 40', receiving therethrough a cutter support bar 42, which is locked in place, as by means of set screws 44, threaded against the bar 42, through the outer ends of the posts. The support bar 42 has, on its forward end, an enlarged cross section head 46 provided with a mutilated radial bore 48, extending therethrough, through which the shank 49 of a cutter 50 is removably engaged. The bore 48 has a V-shaped rear wall 52 which provides a sharp apex 53, against which the shank 49 is securably engaged, by means of radially spaced set screws 54, threaded rearwardly through the head 46. The inner end of the shank 49 carries a suitable cutter blade 56, adapted to engage and face the shoulder 58 of the tool 12. The cutter assembly sleeve 34 is provided with a relatively large diameter gearwheel 60, on its rear end.

For quickly and easily connecting and disconnecting the mandrel 16 from the tool 12, a tubular fitting 62 is provided in the bore 64 of the mandrel, adjacent to the rear end thereof. The fitting 62 is smaller in diameter than and is centered relative to the bore 64, by means of an annular lateral rib 66, secured to the wall of the bore 64. The side wall of the fitting 62 is provided, from its rear end, with diametrically opposed slots 68, which are adapted to receive diametrically opposed pins 70 on a stem 72 having a lateral crank handle 74 on its outer end, when the stem 72 is inserted in the fitting, for rotating the mandrel for threading its top 18 into and out of the tool joint 14. A reduced terminal 75, on the rear end of the mandrel 16, is provided with aligned radial threaded bores 77, adapted to receive mandrel rotating handle bars (not shown).

As shown in FIGURE 4, the rear sleeve bearing 28 reaches rearwardly beyond the cutter assembly sleeve 34, and is formed with an annular groove 76. Circumposed on the mandrel 16, behind the sleeve 34 is a stationary sleeve bearing 78 having an annular groove 80, adjacent its forward end. A sectional ring 82 has spaced internal annular ribs 84 which are rotatably engaged in the grooves 76 and 80, whereby the sleeve bearings 28 and 78 are connected together to move forwardly and rearwardly along the mandrel 16.

The sleeve bearing 78 has another annular groove 86, adjacent to its rear end, and a mandrel positioning nut 88, threaded, as indicated at 90, on the rear end of the mandrel, has a forward extension 92, provided with an annular groove 94. The nut has circumferentially spaced radial handle rods 95 which facilitate manually rotating the nut. A sectional ring 96 has spaced internal ribs 97 which are rotatably engaged in the grooves 86 and 94, whereby the nut 88 is connected to the sleeve bearing 78 and whereby rotation of the nut 88, on the mandrel, in opposite directions, serves to move the cutter assembly 98 forwardly and rearwardly, relative to the tool shoulder 58 to be faced. The sections 100 of the sectional rings 82 and 96 are separably connected together by means of bolts 102, threaded through the ends thereof. The mandrel screw-thread 90 is preferably on the order of ten threads per inch, so as to afford vertical adjustment of the cutter assembly 98, relative to the tool shoulder 58.

A drive assembly sleeve 104 is rotatably circumposed on the sleeve bearing 78, and has a radial tubular housing 106 extending outwardly therefrom, having an outer end wall 108, formed with a centered opening 110 which receives a slidable and rotatable pin 112 having an enlarged knob 111 on its outer end. The pin 112 has an inner end 114 which extends through an opening 116, provided on the sleeve 78, and is adapted to be extended into any one of a series of circumferentially spaced adjustment holes 118, provided in the sleeve bearing 78, for locking the sleeve 104 in a selected rotated relationship to the sleeve bearing 78. The pin 112 has a stop collar 120, within the housing 106, adapted to bear against the outer surface of the sleeve bearing 78, to limit inward extension of the pin, by a coil spring 122, circumposed on the pin and compressed between the collar 120 and the end wall 108 of the housing. An outstanding arcuate rib 124, on the outer end of the housing 106 is provided, onto which a lateral pin 126, on the pin 112, is adapted to be engaged, as shown in FIGURE 4, for holding the inner end of the pin out of the adjustment holes 118 of the sleeve bearing 78, when desired, so that the sleeve can be rotated relative thereto.

The sleeve 104 is a component of a drive assembly 128, which comprises a radial web 130 which terminates, at its outer end, in a tubular bearing 132, parallel to the sleeve 104, through which a drive shaft 134 is journaled, and extends rearwardly beyond the rear end of the mandrel 16, where it has keyed thereon, as indicated at 136 a socket 138 of a universal joint 140, whose other member 142 is adapted to be operatively connected to motor means, such as a flexible shaft 144, connected to a motor (not shown).

The drive shaft 134 has fixed, on its forward end, a pinion 146, having a lateral annular shoulder 148, on its rear end, which, on forward shifting of the shaft 134 makes driving engagement with the teeth of the gear wheel 60, for rotating the cutter assembly on the mandrel 16, whereby the cutter blade 56 moves around and faces the tool shoulder 58.

The drive assembly 128 further comprises a manual clutch which includes a longitudinally slidable shift bar 150 which slides through a block 152, suitably secured to one side of the web 130, and having an opening 154, in its upper edge, which exposes an intermediate part of the shift bar 150, as shown in FIGURE 1. The shift bar 150 has a lateral finger 156, on its rear end, which is engaged in an annular groove 158 in a fitting 160 which is circumposed on the drive shaft 134, between the bearing and the universal joint member 138, and secured in place thereon, as by means of a set screw 162.

A clutch lever 164, whose outer end is positioned alongside of the housing 106, is pivoted on the web 130, as indicated at 166, adjacent to its inner end, and is pivoted, at its inner end, as indicated at 168, to the shift bar 150, within the opening 154 of the block 152. Moving the clutch lever 164 in opposite directions, engages and disengages the drive shaft pinion 146 from the gearwheel.

The mandrel 16 has threaded radially therein, as indicated at 170, in FIGURES 4 and 5, the shank of a screw 172, having a cylindrical head 174, having an Allen type socket 176, in its outer end. The head 174 is disposed in a longitudinally elongated slot 178, provided in the side wall of the rear sleeve bearing 78, whereby limited longitudinal movement of the bearing 78, relative to the mandrel 16, is provided for, and rotation of the bearing 78 on the mandrel precluded. The screw head 174 is accessible through a longitudinally elongated slot 180, in the side wall of the rear bearing sleeve 104.

In use and operation, the tip 18 of the mandrel 16 having been screwed all the way into the female joint 14 of the tool 12, with the cutter blade 56 disposed in the groove 20, the cutter 50 is fed forwardly, relative to the mandrel 16, by rotating the feed nut 88, on the mandrel, so that the cutter blade 56 engages the tool shoulder 58. The cutter assembly is then rotated on the mandrel for moving the cutter blade 56 around the shoulder 58, by moving the clutch lever 164 in a direction to move the drive shaft 134 forwardly and engage the pinion 146 with the teeth of the gear wheel 60.

While the cutter assembly is thus rotated, the cutter blade 56 is adapted to be fed further forwardly, as the shoulder 58 is reduced, by rotating the feed nut 88 in the appropriate direction. The rear surface of the nut 88 and the rear end of the mandrel 16 can be provided with components of a vernier scale (not shown) whereby the amount of feed of the cutter blade 56 to the tool shoulder 58 can be accurately determined.

The pin 112 and the series of holes 118 in the rear sleeve bearing 78 are provided so that, regardless of the rotary position of the mandrel 16, the web 130, and hence, the drive shaft 134, can be desirably located in a perpendicular pendant position, beneath the rear sleeve 104, where the same are out of the way of an operator of the machine, and less stress is imposed on the machine and the tool.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In a pipe shoulder facing machine, a tubular cylindrical mandrel having a threaded conical tip on its forward end adapted to be threaded into the joint of a pipe, means on the rear end of the mandrel for rotating the tip into and out of the joint, a cutter assembly comprising a sleeve journaled on the mandrel behind the tip and having a concentric gearwheel fixed thereon, radial post means extending laterally from the sleeve, a longitudinal support bar extending securably through the post means and having a head on its forward end, a radially inwardly extending cutter mounted on said head and having a blade on its inward end, adapted to engage with the end of a pipe, said mandrel having an annular groove behind said tip in which the cutter blade is positioned, means mounted on the mandrel behind the cutter assembly sleeve for feeding the assembly forwardly, a drive assembly having a relatively stationary member mounted on the mandrel between the cutter assembly and the feed means, a drive shaft journaled on the member and having a pinion engageable with the gearwheel, said member comprising a rear sleeve slidably journaled on the mandrel and having a laterally extending web carrying a bearing through which the drive shaft is journaled, said drive shaft being slidable in the bearing and having a fitting thereon provided with an annular groove, a longitudinally movable shift bar mounted on the web and having a lateral finger engaged in the fitting groove, and a clutch lever pivoted intermediate its ends on the web and pivoted at its inward end to the shift bar.

2. In a pipe shoulder facing machine, a tubular cylindrical mandrel having a threaded conical tip on its forward end adapted to be threaded into the joint of a pipe, means on the rear end of the mandrel for rotating the tip into and out of the joint, a cutter assembly comprising a sleeve journalled on the mandrel behind the tip and having a concentric gearwheel fixed thereon, radial post means extending laterally from the sleeve, a longitudinal support bar entending securably through the post means and having a head on its forward end, a radially inwardly extending cutter mounted on said head and having a blade on its inward end, adapted to engage with the end of a pipe, said mandrel having an annular groove behind said tip in which the cutter blade is positioned, means mounted on the mandrel behind the cutter assembly sleeve for feeding the assembly forwardly, a drive assembly having a relatively stationary member mounted on the mandrel between the cutter assembly and the feed means, a drive shaft journaled on the member and having a pinion engageable with the gearwheel, said member comprising a rear sleeve slidably journaled on the mandrel and having a laterally extending web carrying a bearing through which the drive shaft is journaled, said drive shaft being slidable in the bearing and having a fitting thereon provided with an annular groove, a longitudinally movable shift bar mounted on the web and having a lateral finger engaged in the fitting groove, and a clutch lever pivoted intermediate its ends on the web and pivoted at its inward end to the shift bar, the pinion being on the forward end of the drive shaft, and a universal coupling on the rear end of the drive shaft.

3. In a pipe shoulder facing machine, a tubular cylindrical mandrel having a threaded conical tip on its forward end adapted to be threaded into the end of a pipe, means on the rear end of the mandrel for rotating the tip into and out of the pipe, a cutter assembly comprising a sleeve journaled on the mandrel behind the tip and having a concentric gearwheel fixed thereon, radial post means extending laterally from the sleeve, a longitudinal support bar extending securably through the post means and having a head on its forward end, a radially inwardly extending cutter mounted on said head and having a blade on its inward end, engageable with the pipe, said mandrel having an annular groove behind said tip in which the cutter blade is positioned, means mounted on the mandrel behind the cutter assembly sleeve for feeding the assembly forwardly, a drive assembly having a relatively stationary member mounted on the mandrel between the cutter assembly and the feed means, a drive shaft journaled on the member and having a pinion engageable with the gearwheel, spaced sleeve bearings slidably circumposed on the mandrel on which the cutter assembly sleeve is journaled, an arcuate shoe engaged with the mandrel between the forward bearings and having a hole, and a screw threaded through the sleeve and having a tip engageable in the hole for forcing the shoe against the mandrel for retaining the sleeve at times against rotating and sliding on the mandrel.

References Cited in the file of this patent
UNITED STATES PATENTS

| | | |
|---|---|---|
| 113,038 | Finger | Mar. 28, 1871 |
| 248,263 | Sellers et al. | Oct. 11, 1881 |
| 884,966 | Westbrook | Apr. 14, 1908 |
| 1,184,548 | McAlexander | May 23, 1916 |
| 2,092,637 | Brown | Sept. 7, 1937 |
| 2,181,450 | Davenport | Nov. 28, 1939 |
| 2,531,163 | Rutherford | Nov. 21, 1950 |